(12) United States Patent
Chen

(10) Patent No.: US 7,023,684 B1
(45) Date of Patent: Apr. 4, 2006

(54) VARIABLE POSITION SENSOR EMPLOYING CAPACITANCE

(76) Inventor: Jack Chen, 300 Windsor Dr., Oak Brook, IL (US) 60521

( * ) Notice: Subject to any disclaimer, the term of this patent is extended or adjusted under 35 U.S.C. 154(b) by 0 days.

(21) Appl. No.: 11/141,832

(22) Filed: Jun. 1, 2005

(51) Int. Cl.
*H01G 5/00* (2006.01)

(52) U.S. Cl. ............... 361/287; 361/290; 361/292; 361/296

(58) Field of Classification Search ........... 361/287, 361/280, 281, 283.1, 290, 292, 296, 299.4, 361/298.2, 283.3; 73/218, 517
See application file for complete search history.

(56) References Cited

U.S. PATENT DOCUMENTS 5,150,275 A * 9/1992 Lee et al. ............ 361/283.4
5,367,429 A * 11/1994 Tsuchitani et al. .......... 361/280
6,033,370 A * 3/2000 Reinbold et al. .......... 600/595

\* cited by examiner

*Primary Examiner*—Anthony Dinkins
(74) *Attorney, Agent, or Firm*—Robert L. Marsh

(57) ABSTRACT

A variable position sensor has a stationary portion and a moveable portion. A plurality of plates are positioned on one of the members with the surfaces of the plates forming segments of a larger surface. A single plate is mounted on the other of the two members. One pole of an electric potential is applied to a first of the plurality of plates on the one member and the second pole of the electric potential is applied to the single plate on the other member. Similarly a pole of an electric potential is separately applied to each of the other of the parallel plates and to the one plate. When the one plate is positioned adjacent one of the plurality of plates a capacitance is formed between the adjacent plates, and by detecting the capacitance the position of the one plate can be determined.

10 Claims, 6 Drawing Sheets

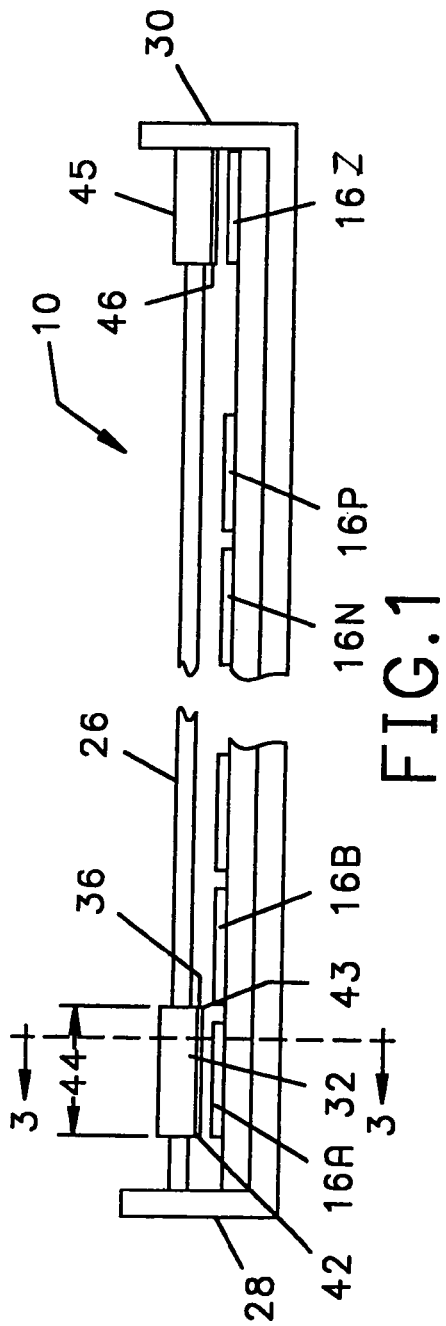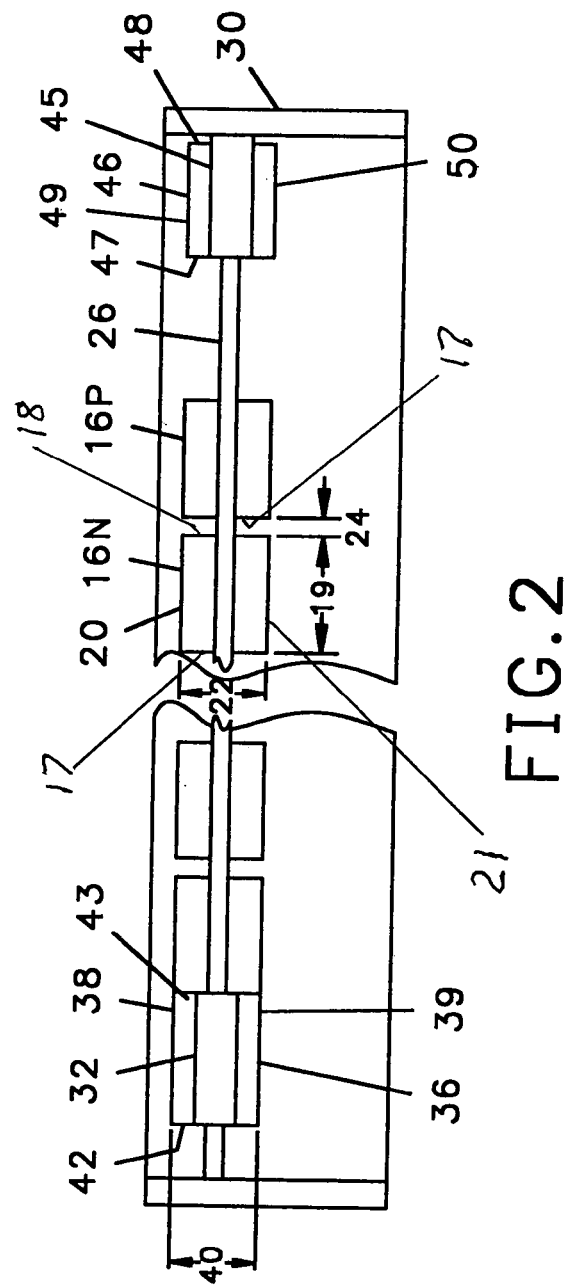

VARIABLE POSITION SENSOR EMPLOYING CAPACITANCE

The present invention relates to an improved position sensor, which may be either angular or linear, and operates without requiring a brush to make electrical contact between the parts, and specifically to a variable position sensor employing capacitance to determine position.

BACKGROUND OF THE INVENTION

An angular position sensor detects the angular orientation of a rotating shaft with respect to a housing and normally consists of a rotor fitted on the shaft and a housing which surrounds the rotor. Most existing angular position sensors have an annular resistive element that surrounds the rotor and a brush that makes electrical contact with the rotor to measure changes in resistance to determine the angular orientation of the rotor.

Linear position sensors are employed to measure linear movement of one object with respect to another. Most existing linear position sensors include a generally planar resistive member along which moves the distal end of a wiper. For both angular and linear position sensors employing resistance, an electrical circuit is provided to measure the change in resistance that occurs as the wiper moves along the resistive member to thereby determine the position of the wiper with respect to the resistor.

Where a wiper moves along a resistive member, the wiper may cause small particles of material to be loosened from the resistive member and the loosened particles may cause contamination of the surrounding environment in which the detector is positioned. For example, if the detector is used to detect the amount of liquid in a container, the particles loosened by the wiper may contaminate the liquid. Alternately, particles in the surrounding environment in which the detector is located may interfere with the movement of the wiper with respect to the resistor and cause the device to provide an incorrect reading of the position of the wiper. Furthermore, the movement of the wiper across the resistive surface over a long period of time may alter the resistive qualities of the resistive material, or wear the resistive material away altogether such that the device no longer provides an accurate reading of position.

To avoid the problems that occur in which variable position sensors that rely upon contact between a stationary member and a moving member, it is desirable that the parts be made so as not to require such contact. Efforts have been made to use magnetism and magnetic fields to provide a position sensor that does not require physical contact between a stationary part and a moveable part, but such magnetically operated position sensors may not be useable in circumstances where the magnetic field will interfere with other adjacent devices.

Variable capacitors have also been used as position sensors. Such variable capacitors have a stationary plate or electrode and a parallel moveable electrode. The moveable electrode is moveable between a first position in which the two electrodes are overlapping, or aligned with each other so as to maximize capacitance to a second misaligned position in which the electrodes are not overlapping so that capacitance is minimized. Such variable capacitance requires a relatively large amount of space to provide the same degree of accuracy as resistor type position sensor for several reasons. One is that it is difficult to measure small changes in capacitance and another is that enough space must be provided to allow the plates to become totally misaligned from each other. In the case of an angular position sensor, existing variable capacitors are only rotatable through one hundred eighty degrees, wherein many uses require accurate measurement through three hundred sixty degrees of rotation.

It would be desirable, therefore, to provide a variable position sensor that will accurately provide a reading of the position of a first member that is moveable with respect to a second member and does not rely upon physical contact between the members.

SUMMARY OF THE INVENTION

The present invention is embodied in a variable position sensor having a first stationary member and a second moveable member. A plurality of spaced electrically conductive plates or electrodes are positioned on one member, with the plurality of plates defining the segments of a surface. Where the device measures angular position, the surface defined by the plurality of plates is a circular disc or a hollow cylinder, and where the device measures linear position, the surface is a plane.

An electrically conductive plate or electrode is also positioned on the second member such that movement of the second member with respect to the first member will move the electrically conductive electrode on the second member adjacent to successive ones of the plurality of spaced electrically conductive electrodes on the first member.

The device further includes a detecting circuit for detecting capacitance between the one electrode on the one hand and one of the plurality of electrodes on the other hands. Each of the plurality of electrodes has its own connecting wire, and the position of the moveable electrode with respect to the plurality of electrodes is determined by the circuit that detects a change in capacitance with respect to the one of plurality of electrodes that is adjacent the one electrode.

BRIEF DESCRIPTION OF THE DRAWINGS

A better understanding of the present invention will be had after a reading of the following detailed description taken in conjunction with the drawings wherein:

FIG. 1 is a side elevational view of a linear position sensor employing the present invention;

FIG. 2 is a top view of the device shown in FIG. 1;

DETAILED DESCRIPTION OF PREFERRED EMBODIMENTS

Figure 3:
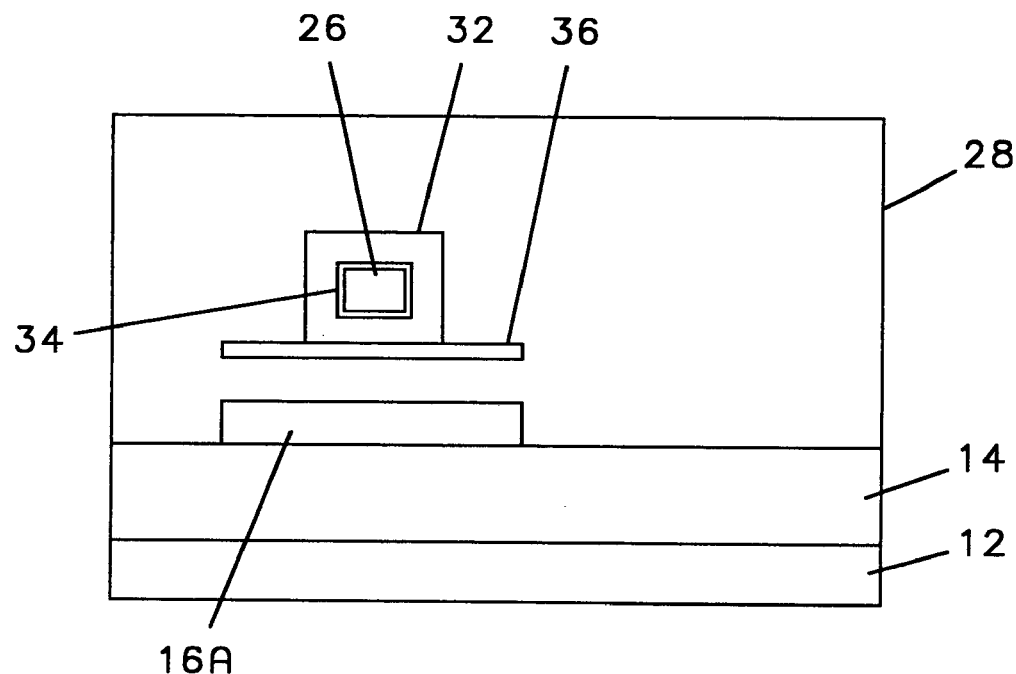
FIG. 3 is a cross-sectional view of the device shown in FIG. 1 taken through line 3—3 thereof.

Referring to FIGS. 1, 2, and 3, a linear position sensor 10 includes a generally planar body 12 having an electrically nonconductive insulator 14 on the upper surface thereof, and mounted linearly along the upper surface 14 are a plurality of spaced electrically conductive plates 16A, 16B, . . . 16N, . . . 16Z with each plate having a planar upper surface. The planar upper surfaces of all the plates 16A, 16B . . . 16N, . . . 16Z define the segments of the same plane. Each plate, of which plate 16N is representative of all such plates, is rectangularly shaped with parallel opposing ends 17, 18 that define a width 19, and parallel opposing sides 20, 21 that define a length 22. Also, as depicted in FIG. 2, each plate 20N has a spacing 24 between the ends 17, 18 thereof and the ends of the adjacent plate 16P.

The linear position sensor 10 also includes a slide bar 26 retained at the ends thereof by posts 28, 30 mounted perpendicular to the upper surface of the body 12. The elevations of the posts 28, 30 at opposite ends of the slide bar 26 are chosen to space the lower surface of the moveable plate 36 a fixed distance from the surface defined by the stationary plates 16A, 16B, . . . 16N, . . . 16Z. The slide bar 26 has a generally rectangular cross-section, and fitted around the slide bar 26 is a slide 32 having a generally rectangular central opening 34 with dimensions a little larger than those of the slide bar 26 to thereby permit longitudinal movement with a minimum of resistance. Attached to the slide 32 and positioned between the slide bar 26 and the plates 16A, 16B, . . . 16N is a moveable electrically conductive plate 36 having opposing parallel ends 38, 39 defining a length 40 substantially equal to the length 22 of the various stationary plates 16N and having opposing sides 42, 43 defining a width 44 approximately equal to the width 19 of the various plates 16N plus the length of one spacing 24 between any two adjacent plates 16N.

Figure 5:
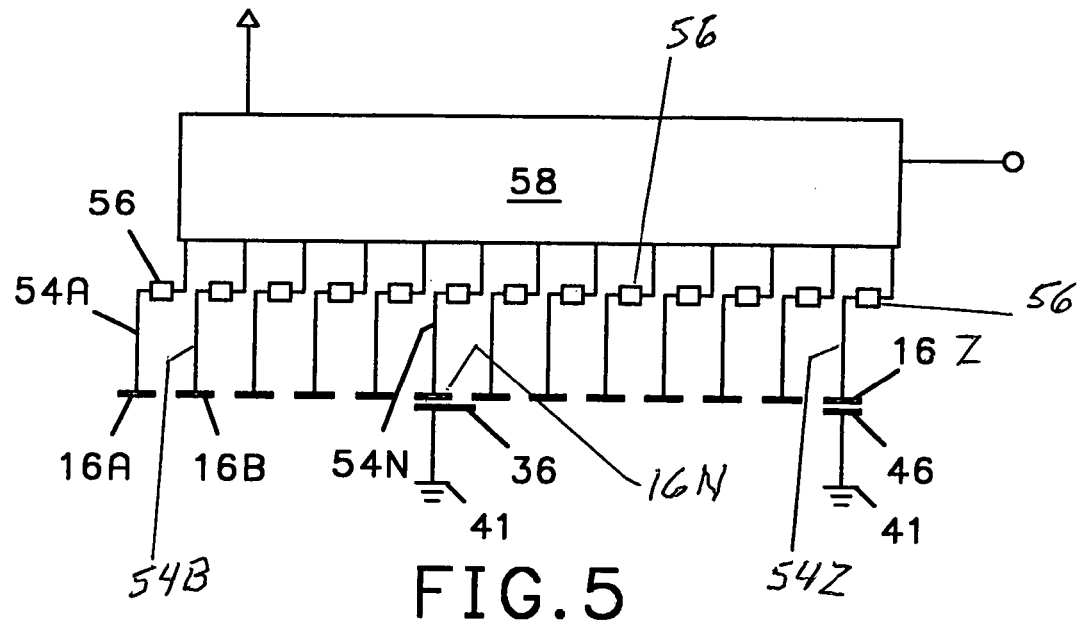
FIG. 5 is a schematic view of a circuit for use with the embodiment shown in FIG. 1.

Referring briefly to FIG. 5, the moveable plate 36 is connected to ground 41. As the slide 32 moves along the slide bar 26, the moveable plate 36 is successively moved opposite one after another of the stationary plates 16A, . . . 16B, . . . 16N. Where the moveable plate 36 moves opposite one of the stationary plates 16N, the moveable plate 36 and the opposing stationary plate 16N form the electrodes of a capacitor and a measurable capacitance is created in the stationary plate 16N with respect to ground.

Referring further to FIGS. 1 and 2, mounted to one of the side posts 30 and to the slide bar 26 is a retainer 45 below which is attached a fixed electrically conductive plate 46 having sides 47, 48 and outer ends 49, 50 that are equal to the length 19 and width 22 of all the plates 16N. The fixed plate 46 is also spaced from the end plate 16Z a distance that is equal to the spacing of the moveable plate 36 from the plane determined by the various plates 16A, 16B, . . . 16N, . . . 16Z. The position of the fixed plate 46 is immediately opposite the end stationary plate 16Z and the plates 16Z, 46 become the electrodes of a calibration capacitor equal to the maximum capacitance formed between the moveable plate 36 and any one of the remaining fixed plates 16A, 16B, . . . 16N.

Referring briefly again to FIG. 5, each of the individual stationary plates 16A, 16B, . . . 16N, . . . 16Z is connected by a suitable connector 54A, 54B, . . . 54N, . . . 54Z to a sensing circuit 56 of the type known in the art to detect and measure capacitance. A sensing circuit 56 may be provided for each of the stationary plates 16A, 16B . . . 16N . . . 16Z as shown or they may be encapsulated into a single ICU 58.

Where the moveable plate 36 is adjacent one of the stationary plates 16N, a measurable capacitance will be detected with respect to such plate 16N. Since the position of the stationary plate 16N in which capacitance is detected is known the position of the moveable plate 36 can be determined.

Figure 4:
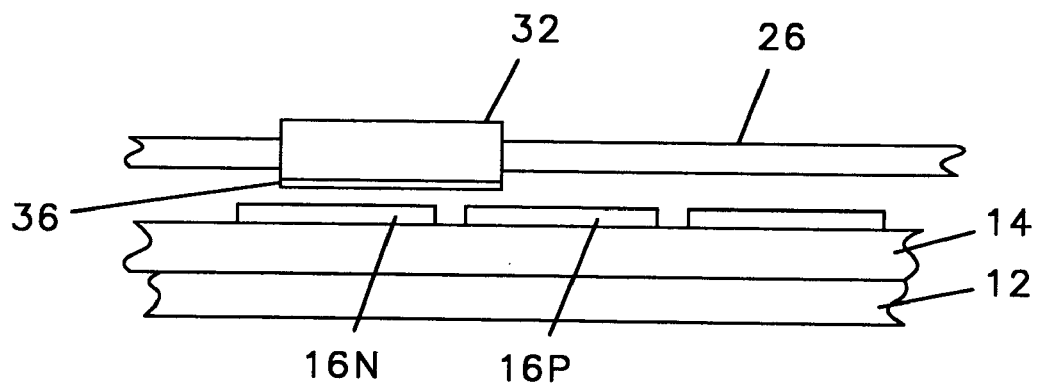
FIG. 4 is a fragmentary side view of the device shown in FIG. 1 with the slide removed to a position between two adjacent stationary electrodes.

Referring to FIGS. 1, 2 and 3, one aspect of the invention is that the width 44 of the outer ends 42, 43 of the moveable plate 36 is equal to the sum of the width 19 of one of the stationary plates 16N plus one spacing 24, the distance between any two adjacent plates 16A, 16B, . . . . 16N. When the moveable plate 36 is positioned directed opposite one of the stationary plates 16N as shown in FIGS. 1 and 2, the capacitance provided by plate 16N will be equal to the capacitance detectable to plate 16Z. As shown in FIG. 4, when the slide 32 incurs an incremental movement along the slide bar 26, a portion of the moveable plate 36 will move away from plate 16N and an equally sized portion of the plate 36 will then move opposite a portion of the adjacent plate 16P. When this occurs, the capacitance detectable for plate 16N will be reduced by a fixed amount. Also, with the reduction of the capacitance in plate 16N, a small capacitance, corresponding to the amount of the reduction in the capacitance of plate 16N, will now be detected in the adjacent plate 16P. By calculating the fractional decrease of capacitance detected from plate 16N and calculating the fractional increase in the capacitance now detectable in plate 16P, a relatively precise determination of the linear position of the slide 32 with respect to the two plates 16N, 16P can be determined.

The capacitance between a pair of parallel spaced plates varies in response to changes in the surrounding environment such as temperature, humidity and air pressure. To compensate for such environmental changes, the stationary plate 16Z and the fixed plate 46 positioned opposite thereto form a detectable capacitance that is used by the sensing circuit 56 to calibrate the maximum capacitance that can be formed between one of the stationary plates 16A, 16B, . . . 16N and the moveable plate 36. The maximum capacitance, as determined by the calibrating plates 16Z, 46, is used to calculate the fraction by which capacitance of a plate 16N is reduced and the fraction by which the capacitance of an adjacent plate 16M is increased. The ratio of the capacitance detected in the two plates 16M, 16N is then used to precisely determine the position of the slide 32.

Referring to FIGS. 6 through 9, the concepts of the present invention may also be employed in an angular position sensor 60. The angular position sensor 60 has a planar disc-shaped stationary member 62 made of an electrically insulating material having a central opening 64 through which a rotating shaft 66 extends. Mounted on the shaft 66 and spaced a short distance from the surface of the stationery member 62 is a rotating disc 67 made of an electrically insulating that is locked to the shaft 66 for rotation therewith.

Figure 6:
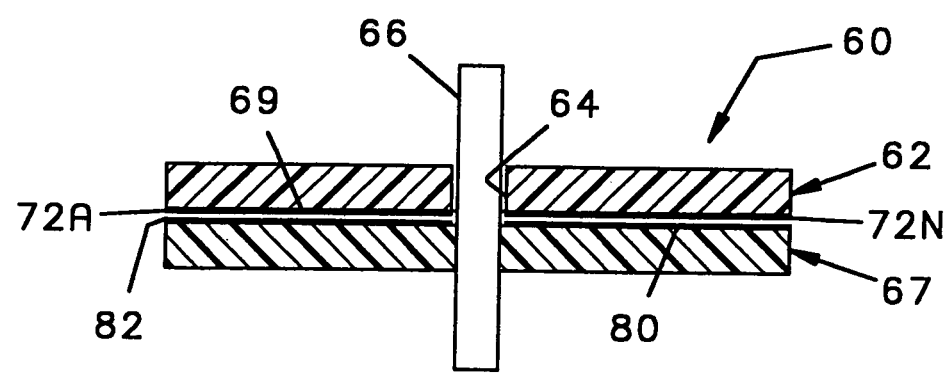
FIG. 6 is a cross-sectional view of an angular position sensor employing the present invention.
Figure 7:
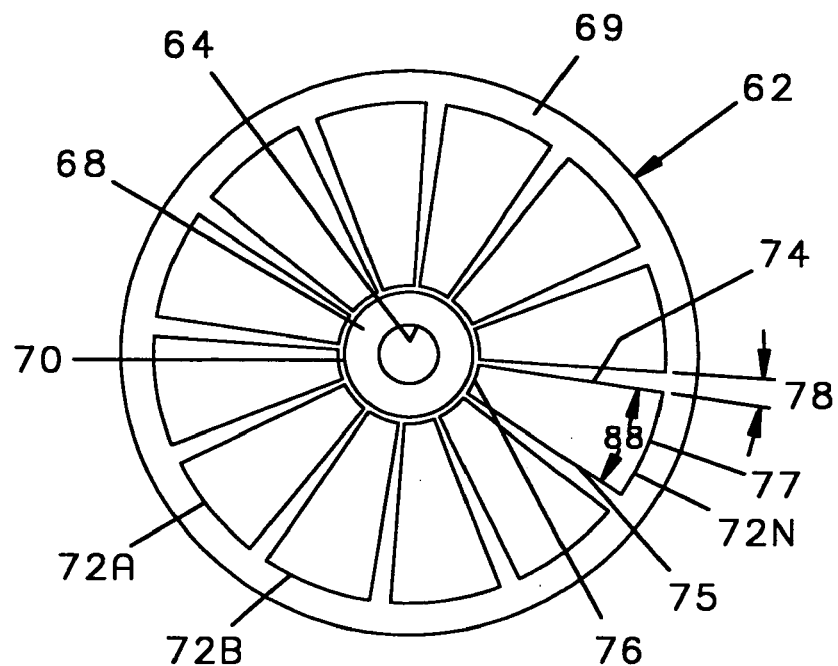
FIG. 7 is a front view of the stationary disc used in the embodiment shown in FIG. 6.

Referring to FIGS. 6 and 7, the surface 69 of the stationary member adjacent the rotating disc 67 is planar. Positioned on the surface 69 and surrounding the central opening 64 is an annular electrically conductive calibrating ring 68 having a circular outer edge 70. Also mounted on the surface 69 and spaced radially outward of the outer edge 70 of the ring 68 and extending around the circumference thereof, are a plurality of generally trapezoidally shaped electrically conductive plates 72A, 72B, . . . 72N each of which is electrically insulated from adjacent plates and from the ring 68. Each plate 72N has converging sides 74, 75, an inner arcuate end 76, and an outer arcuate end 77. The sides 74, 75 of each plate 72 are spaced from the parallel side of an adjacent plate 72M by a fixed angular distance 78. The inner arcuate ends 76 of all the plates 72A, 72B, . . . 72N define a first circle concentric with the central opening 64 and the outer ends 77 of all the plates 72A, 72B, . . . 72N define a second circle concentric with the first and with the central opening 64. Also the converging sides 74, 75 of the various plates 72A, 72B, . . . 72N are segments of radii extending between the inner and outer circles defined by the arcuate segments 76, 77.

Figure 8:
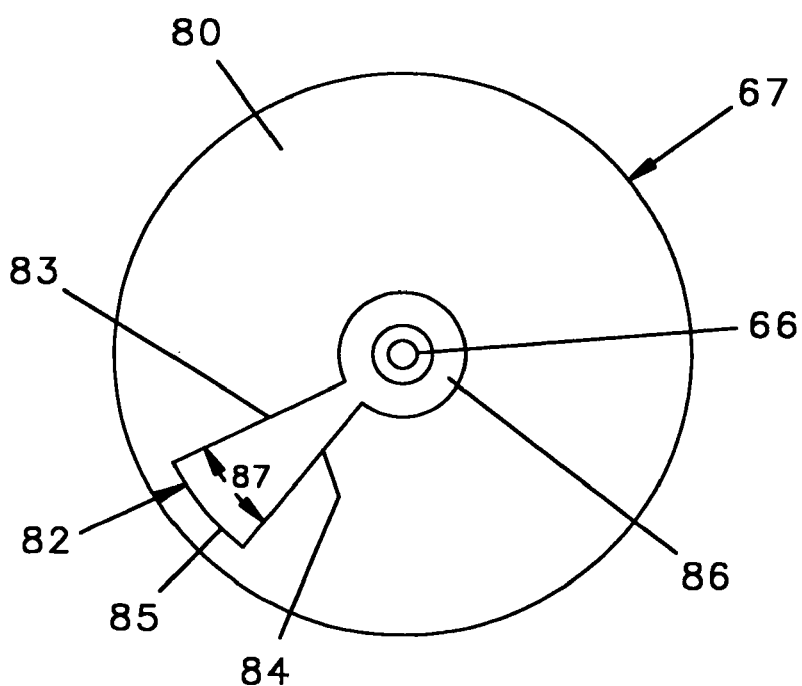
FIG. 8 is a front view of the disc on the rotating shaft of the embodiment shown in FIG. 5.

Referring to FIGS. 6 and 8, the rotating disc 67 has a generally planar surface 80, and mounted on the surface 80 so as to be directed toward the plates 72A, 72B, . . . 72N is a trapezoidal plate 82 having converging sides 83, 84 and an arcuate outer end 85. The inner end of the trapezoidal plate 82 joins to the outer circumference of an annular portion 86 which is positioned opposite the surface of the calibrating ring 68 on the stationary member 62. The surface area of annular portion 86 and the surface area of the calibrating ring 68 are equal to the surface area of any one of the trapezoidal plates 72A, 72B, . . . 72N such that the adjacent plates 68, 86 form the electrodes of a calibration capacitor having a capacitance equal to the capacitance formed between the rotating trapezoidal plate 82 and any one of the stationary plates 72N when the rotating plate 82 is positioned directly opposite one of the stationary plates 72N.

Referring further to FIGS. 7 and 8, the angular spacing 87 between the converging sides 83, 84 of the trapezoidally shaped rotatable plate 82 is equal to the angular spacing 88 between the converging sides 74, 75 of the outer edge of any of the trapezoidal plates 72N plus the angular distance 78 between any two of the plates 72A, 72B, . . . 72N. Accordingly, as the rotating disc 67 turns with the shaft 66, the rotating plate 82 will be positioned opposite successive ones of the stationary plates 72A, 72B, . . . 72N. Also, each time the rotating plate 82 moves to a position where it is offset and angle with respect to any one of the stationary plates 72A, 72B, . . . . 72N, such as plate 72A, the rotating plate 82 will move over an equal angular portion of the adjacent plate 72B. The capacitance detectable in the first plate 72A will then be reduced by a given amount and capacitance will be detectable in the adjacent plate 72B equal to the capacitance lost from the first plate 72A.

Figure 9:
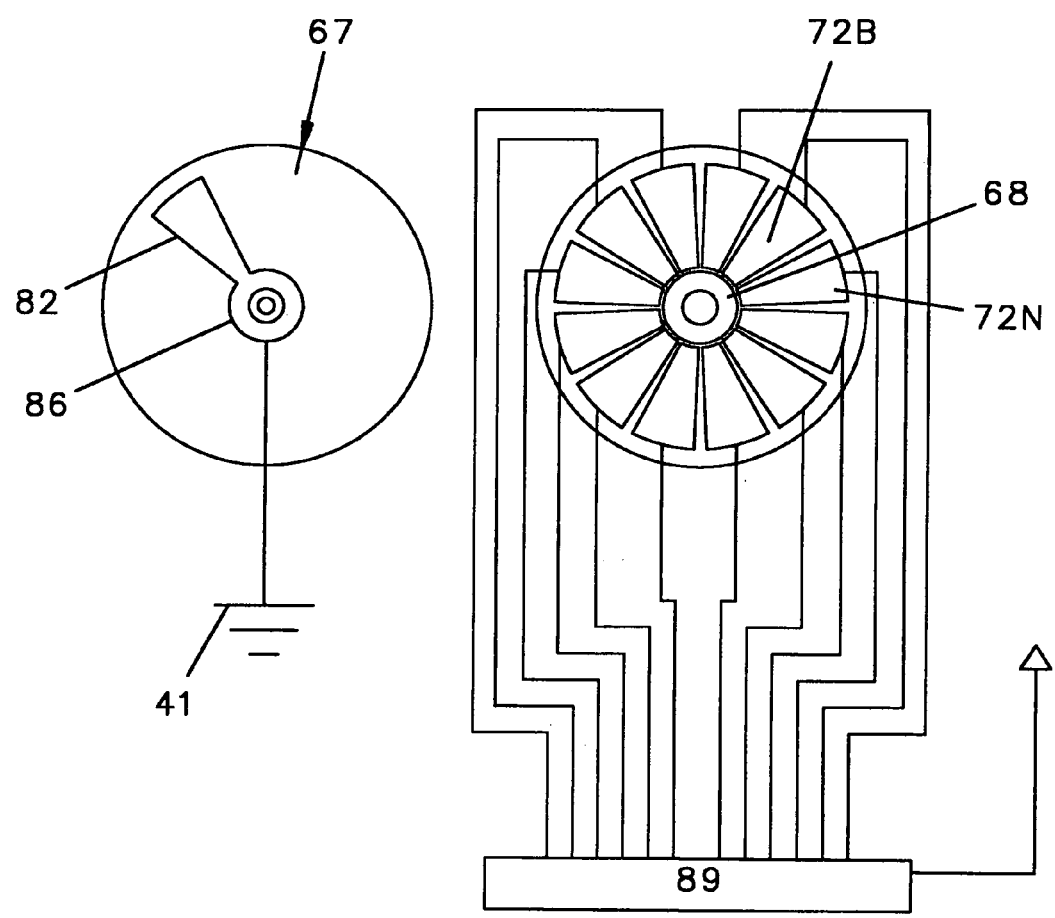
FIG. 9 is a schematic view of a circuit for use with the embodiment shown in FIG. 6.

Referring to FIG. 9, the rotating plate 82 and annular surface 86 on the rotating disc 67 are connected to ground 47. Each of the plates 71A, 72B, . . . 72N is connected by separate connectors to a monitoring circuit 89 for measuring the capacitance of each of the plates 72A, 72B, . . . 72N. By providing a comparison circuit such as circuit 56 described above that compares the capacitance between plate 72A and 72B with the capacitance of the calibrating ring 68 and ring 86, a relatively accurate angular position of the rotating plate 82 with respect to the stationary member 62 can be determined. Also, the rotational position sensor 60 can be rotated and will give readings through 360 degrees.

Figure 10:
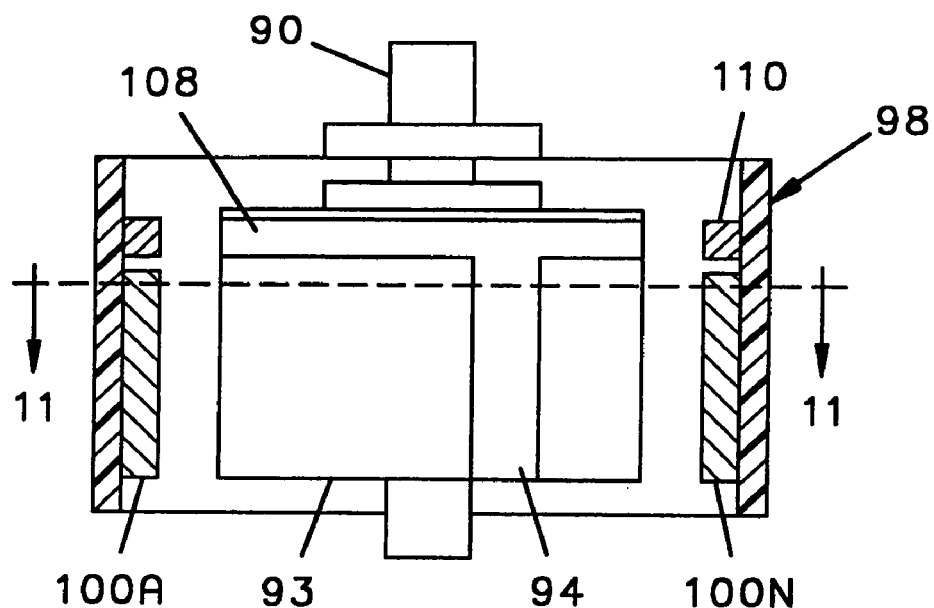
FIG. 10 is a partially cross-sectional view of another embodiment of an angular position sensor employing the invention.
Figure 11:
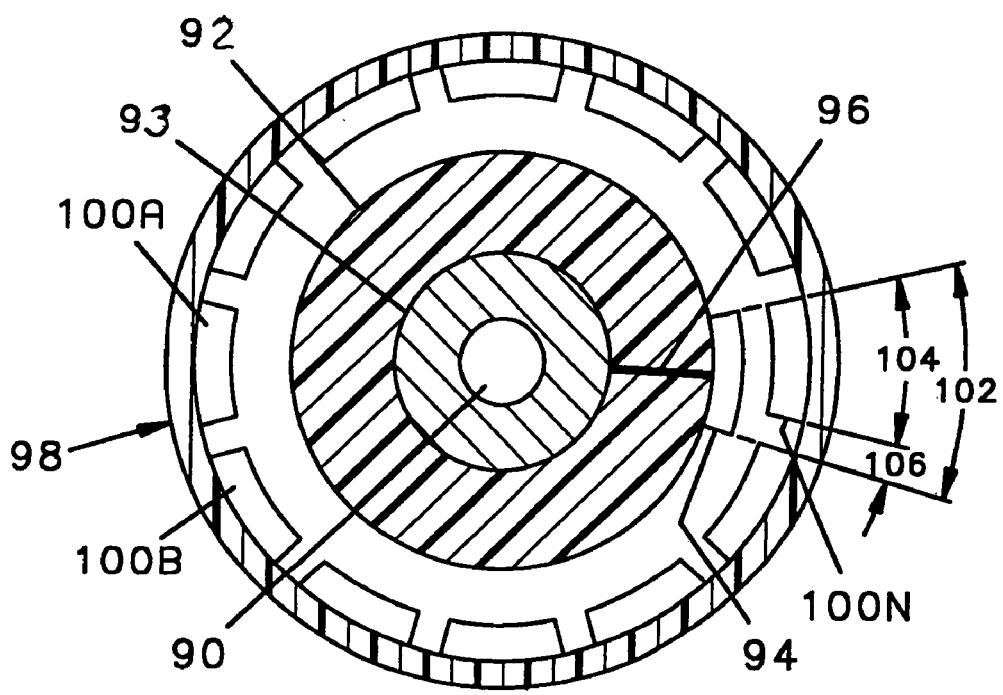
FIG. 11 is a cross-sectional view of the embodiment of FIG. 10 taken through line 11—11 thereof.

Referring to FIGS. 10 and 11, in similar fashion, the present invention can be employed in a cylindrically shaped angular position sensor. In this embodiment, the angular position of a rotating shaft 90 is measured by providing a cylindrical insulating sleeve 92 around a rotor 93 on the shaft 90. Extending across a small portion of the outer surface of the sleeve 92 is an electrically conductive plate 94. The plate 94 is electrically connected by a connector 96 to the metal shaft 90 which in turn is connected to ground, not shown.

Surrounding the rotating shaft 90 is a cylindrical shaped stator 98 having a plurality of spaced electrically conductive plates 100A, 100B, . . . 100N around the inner surface thereof with the surfaces of the various plates 100A, 100B, . . . 100N forming segments of a cylindrical surface spaced a short distance from the cylindrical surface defined by the plate 94. As was the case with the linear position sensor, each of the conductive plates 100A, 100B, . . . 100N is connected to a sensing circuit similar to sensing circuit 56 described above.

As shown in FIG. 11, the arcuate length 102 of the rotating plate 94 is equal to the arcuate length 104 of any one of the stationery plates 100N plus the arcuate spacing 106 between any two plates 100A, 100B, . . . 100N.

To provide a calibrating capacitance, an annular electrically conductive ring 108 is provided on the rotor 93 axially displaced from the rotating plates 94. Mounted on the stator 98 and radially outward of the conductive ring 108 is a second annular plate 110 with the areas of the concentric plates 108, 110 being substantially equal to the area of each of the conductive plates 100A, 100B, . . . 100N such that the concentric electrically conductive plates 108, 110 form a calibrating capacitance as has been previously described. As described with respect to the linear position sensor, the calibrating capacitance can be used to determine fractions of the capacitance between the rotating plate 94 and any one of stationary plates 100N. From a determination of the fractional capacitances, the angular position of the rotating plate 94 can be more accurately determined.

While the present invention has been described with respect to three embodiments, it will be appreciated that many variations and modifications may be made without departing from the true spirit and scope of the invention. It is therefore the intent of the appended claims to cover all such modifications and variations which fall within the true spirit and scope of the invention.

What is claimed is:

1. A variable position sensor comprising
a first stationary member and a second moveable member,
a plurality of spaced electrically conductive plates on one of said first member and said second member,
said plurality of spaced plates defining segments of a surface,
an electrically conductive plate on the other of said first member and said second member, wherein movement of said second member with respect to said first member will move said electrically conductive plate on said other of said first and second members adjacent successive ones of said plurality of spaced electrically conductive plates,
means for applying a first pole of an electric potential to all of said plurality of spaced plates and a second pole of said electric potential to said electrically conductive plate on said other of said first and second member, and
means for detecting a capacitance between one of said plurality of spaced conductive plates and said electrically conductive plate on said other of said first and second member wherein a position of said second moveable member with respect to said first stationary member is determined.

2. A variable position sensor in accordance with claim 1 wherein said plurality of plates defines a planar surface.

3. A variable position sensor in accordance with claim 1 wherein said plurality of plates define a cylindrical surface.

4. A variable position sensor comprising
a first member and a second member,
one of said first and second members being stationary and the other of said first and second member being moveable, a plurality of spaced electrically conductive plates on said first member, said plurality of spaced plates defining segments of a surface, an electrically conductive plate on said second member, wherein movement of said other member with respect to said one member will move said electrically conductive plate on said second member adjacent successive ones of said plurality of spaced electrically conductive plates on said first member, said electrically conductive plate on said second member being grounded, and means for detecting a capacitance in one of said plurality of spaced conductive plates on said first member as said second of said members moves with respect to said first of said members wherein a position of said moveable member with respect to said stationary member is determined.

5. A variable position sensor in accordance with claim 4 wherein said plurality of plates defines a planar surface.

6. A variable position sensor in accordance with claim 4 wherein said plurality of plates define a cylindrical surface.

7. The variable position sensor of claim 4 and further comprising a calibrating capacitor having capacitance equal to a maximum capacitance between one of said plurality of spaced conductive plates and said electrically conductive plate on said second member, and means for comparing a partial capacitance detected in one of said spaced conductive plates to said calibrating capacitance.

8. The variable position sensor of claim 4 wherein each of said plurality of spaced conductive plates has a width, said widths of all of said plurality of spaced conductive plates being equal to every other, said plurality of spaced conductive plates being equally spaced apart by a given distance between such conductive plates, and said electrically conductive plate on said second member having a width equal to said width of one of said plurality spaced conductive plates plus said given distance.

9. The variable position sensor of claim 8 wherein said plurality of spaced conductive plates are spaced around a shaft and said width of said plurality of spaced conductive plates is an angular width.

10. The variable position sensor of claim 8 and further comprising means for measuring a first partial capacitance in a first of said plurality of spaced conductive plates and measuring a second partial capacitance in a second of said plurality of spacer conductive plates for determining a position of said electrically conductive plate on said second member that is partially between said first and said second of said plurality of spaced conductive plates.

* * * * *